US011986430B2

(12) United States Patent
Wolfe

(10) Patent No.: US 11,986,430 B2
(45) Date of Patent: May 21, 2024

(54) PORTABLE MEDICAL LIFT AND POSITIONING DEVICE

(71) Applicant: MODERN HEALTHCARE EQUIPMENT LLC, Ft. Lauderdale, FL (US)

(72) Inventor: David Michael Wolfe, Fort Lauderdale, FL (US)

( * ) Notice: Subject to any disclaimer, the term of this patent is extended or adjusted under 35 U.S.C. 154(b) by 130 days.

(21) Appl. No.: 17/025,438

(22) Filed: Sep. 18, 2020

(65) Prior Publication Data

US 2022/0087886 A1 Mar. 24, 2022

(51) Int. Cl.

| | |
|---|---|
| ***A61G 7/075*** | (2006.01) |
| ***A47C 20/00*** | (2006.01) |
| ***A47C 20/02*** | (2006.01) |
| ***A47C 20/04*** | (2006.01) |
| ***A61G 7/07*** | (2006.01) |

(52) U.S. Cl.

CPC ............ *A61G 7/075* (2013.01); *A47C 20/021* (2013.01); *A47C 20/023* (2013.01); *A47C 20/027* (2013.01); *A47C 20/041* (2013.01); *A47C 20/042* (2013.01); *A61G 7/072* (2013.01); *A61G 7/0755* (2013.01)

(58) Field of Classification Search

CPC ...... A61G 7/075; A61G 7/072; A61G 7/0755; A47C 20/021; A47C 20/023; A47C 20/027; A47C 20/041; A47C 20/042; B66F 3/22; B66F 11/042

USPC .............................................................. 5/612

See application file for complete search history.

(56) References Cited

U.S. PATENT DOCUMENTS 1,748,954 A * 3/1930 Herrmann ............ A61G 13/121 27/13
3,159,371 A * 12/1964 Weissenberg .......... A47B 11/00 248/346.06
3,384,384 A * 5/1968 Diehl ..................... B62D 61/08 280/43.18
3,522,925 A * 8/1970 Buchtel .................... A47C 3/20 248/371

(Continued)

*Primary Examiner* — Justin C Mikowski
*Assistant Examiner* — Luke Hall
(74) *Attorney, Agent, or Firm* — McCarter & English, LLP; James M. Smedley; Alex Korona

(57) ABSTRACT

A lift and position device and methods of use therewith designed to aid attendants in moving and propping the various selected body parts of a patient from atop a support surface, for example, a mattress. The device utilizes a base for stability, a separately powered screw jack, radial adjustment head, a cushion cradle and a single or plurality of fitted cushion(s) configured to optimally raise and lower a particular body part of a patient such as his or her arms, torso, legs, back and the like. All elements of the device are ultralight and ultra-strong, some or all of the components of the device being composed of Carbon Fiber, Aluminum, injection molded plastic, and Titanium. The device utilizes advantageous mechanics of jack technology modified to suit the specific needs of an attendant wishing to the lift, position or prop and secure a particular body part of a patient, for example, an immobile, obese or otherwise incapacitated patient. In addition, the device will aid in daily turning of patients, pulmonary relief via leg elevation and enhanced healing by securely holding appendages still and securely at various angles and heights for an unlimited amount of time.

7 Claims, 12 Drawing Sheets

(56) References Cited

U.S. PATENT DOCUMENTS

| | | | | | |
|---|---|---|---|---|---|
| 3,931,653 | A * | 1/1976 | Bien | A47C 20/027 | 5/660 |
| 4,185,342 | A * | 1/1980 | Young | A47C 20/027 | 5/634 |
| 4,555,121 | A | 11/1985 | Lockard et al. | | |
| 5,425,567 | A * | 6/1995 | Albecker, III | A47C 7/46 | 297/452.29 |
| 5,489,258 | A | 2/1996 | Wohnsen et al. | | |
| 5,491,855 | A * | 2/1996 | Charles | A47G 9/1009 | 5/636 |
| 5,774,915 | A | 7/1998 | Scott et al. | | |
| 7,836,890 | B2 * | 11/2010 | Waterman | A47C 20/027 | 108/1 |
| 2001/0037525 | A1 * | 11/2001 | Visser | A61B 6/0421 | 5/622 |
| 2004/0059268 | A1 * | 3/2004 | Polonchek | A61G 7/0755 | 601/33 |
| 2006/0290195 | A1 * | 12/2006 | Roleder | A61G 7/072 | 297/397 |
| 2011/0016627 | A1 | 1/2011 | Blevins et al. | | |
| 2011/0280700 | A1 | 11/2011 | Uttech et al. | | |
| 2011/0302712 | A1 * | 12/2011 | Patterson | A61G 7/1049 | 5/88.1 |
| 2014/0228185 | A1 * | 8/2014 | Meier | A63B 23/03525 | 482/139 |
| 2014/0243716 | A1 * | 8/2014 | Diot | A61G 7/075 | 601/5 |
| 2016/0228317 | A1 * | 8/2016 | Carn | A61F 5/37 | |
| 2016/0286967 | A1 * | 10/2016 | Burch | A47C 7/725 | |

* cited by examiner

PORTABLE MEDICAL LIFT AND POSITIONING DEVICE

FIELD OF THE INVENTION

The disclosure relates to portable patient lifting machines. Specifically, the disclosure relates to patient lifting machines used to move a patient from one position to another in many forms and iterations therewith on a hospital bed.

INTRODUCTION

The following is not an admission that anything discussed below is prior art or part of the common general knowledge of persons skilled in the art.

U.S. Pat. No. 9,066,842 (Partridge) discloses a lift and move device to be strapped onto a hospital bed in order to lift and move an otherwise incapacitated patient. The lift and transfer and moving device includes a sling having a flat sheet configured with edges to accommodate a side laying person's back, torso, hips and upper legs, etc. The edges of the device allow a system wherein straps may be configured to reposition and secure the side laying person and, thus to enable service personnel to reposition a bedridden person by tugging or pulling on the straps. These straps configure to both secure and rotate the patient so an attending caregiver may roll a laying patient from side-to-side and secure a side laying person on one side or angled side until time for rotation to the other side.

Partridge reference provides an example of a lifting and moving device that is separate and distinguishable from the hospital bed to which it is attached. Thus it may be capable of being detached and attached to a variety of beds.

It is lightweight, portable, attachable and detachable to a bed, capable of lifting, rolling and moving various body parts of a patient, U.S. Pat. No. 9,066,842 performs these functions using an intricate system of belts, straps, slings and buckles.

There exists no present apparatus or system therewith that performs these same functionalities which use a mechanical jack and/or jackscrew as a patient lifting and moving device.

STATE OF THE ART

The hospital industry has been confronting an epidemic that plagues many of its staff: Tens of thousands of nursing employees suffering debilitating injuries every year, mainly from doing part of their everyday jobs—moving and lifting patients.

Nursing employees suffer more back and shoulder injuries than just about any other occupation. Workers who are relatively young have to stop working early in many cases. Often times they go home and experience pain in doing simple household endeavors such as lifting children, groceries, etc. These troubles stem from back injuries, arm injuries, and shoulder injuries suffered in the workplace.

Hospitals have reduced the number of injuries by buying special equipment to move patients and conduct intensive training to teach the staff how to use it. These efforts have in many instances dramatically reduced the instances of injury by nurses.

The need to turn from side-to-side and secure a person in positions confined to a bed with temporary or permanent loss of mobility is well known. Patient rotation from side-to-side is necessary for maintaining patient comfort, facilitating examination, and preventing bed sores from forming. Patients once moved might often need to be secured and placed in static positions wherein arms are raised, legs are elevated, backs are propped, etc. Manual lifting and turning of a bedridden patient is physically demanding for nurses, aides and others responsible for the care of the bedridden patient especially with average body weight in the industrialized world increasing annually. Such labor may result in injury to the back and other body parts of the person doing the lifting and/or turning of the patient. These injuries to nurses, aides and others result in time lost from the job, permanent disabilities, increased health care costs and litigation.

At present, the assemblies used to lift and move patients are very heavy, bulky and cumbersome. Elaborate sling systems mounted to overhead railings have been used to solve the problem of lifting and moving patients in hospitals. U.S. Pat. No. 4,117,561 relates to a wheel driven assembly outfitted with a base, and a boom out of which a sling mounts distally on a railing which extends laterally overhead. The machine can then be used to place a patient inside a sling hung by a chain or rope not unlike a child hanging from a swing set. U.S. Pat. No. 5,327,592 relates to a device which hangs stationary from a ceiling mounted swing which is powered to lift and lower by means of an electric hoist. The patient can be hoisted and lowered after being placed on a sling by one or more caregivers. Even more elaborate devices for lifting and moving patients include devices whose support structures extend a four cornered skeleton box-shape, wherein a mount can be placed overhead. Said mount can track in directions North, South, East, and West by means of elaborate wheeled assemblies. U.S. Pat. Nos. 5,337,908, and 5,511,256 by way of example describe separate incarnations of a hoist mechanism mounted to a frame which extends towards the four walls of a room. The frame itself is outfitted with various forms of rollers and track beams which allow for each respective hoist and sling to track across the room in various directions.

Moreover, assemblies for moving patients may be outfitted within the patient bed itself. Many patents provide examples of this concept in action. U.S. Pat. Nos. 7,568,240, 5,160,010, 5,173,975, 7,568,240, 4,409,695, 4,499,618, 5,105,486, 5,072,840, 5,613,255, 5,636,394, 5,687,437, 7,013,510, 7,237,286, 7,334,277, 7,441,291, 7,461,420, 8,006,332, 8,074,309, 8,104,120, are all examples of beds which are themselves devices which can perform various types of movement of the patient into a myriad of positions by means of moving any one or series of body parts vis-à-vis another body part or series of body parts.

More recently, mechanisms used to move and lift patients have become more portable. U.S. Pat. No. 6,430,761 B1 shows a device which can be wheeled into a room and has no overhead lift and carry sling. Instead it consists of a lifting column which can be lifted and lowered by means of a hand crank mechanism. A seat sling is hung from the lifting column and the patient him or herself or an attendant may place said patient on the seat sling and then move the patient on or off of a bed or wheelchair or car seat as needed. This device collapses into a portable instrument which can be moved, not unlike a piece of wheel-mounted luggage.

Another portable, highly specific patient moving device can be seen in the example of U.S. Pat. No. 8,997,276 B2. Here a boom is attached to a mast on a corner of a patient's bed. Said boom is optionally outfitted with a sling, which like the above mentioned moving devices is capable of hoisting a patient up off of a hospital bed. The configuration of the present example allows for the patient to be rotated and consequently transferred by the boom along the vertical y-axis represented by the mast configuration.

Other mechanisms used in the industry have been proven effective but are highly specified in terms of the type of movement and/or transfer affect. For instance, 8,261,380 B2 describes a modified stretcher that is outfitted as a bed accessory. Said accessory can facilitate a prone to supine or supine to prone patient transfer. The accessory is placed adjacent to a stationary bed and it is capable of providing a flat surface which can be tilted at any angle from 0° to 90°. This has the effect of assisting an attendant to turn a patient from supine to prone or vice versa.

Some more recent devices are mobile, multifunctional, and display modular components which may be used to lift and/or transfer patients. Modularity allows for the use of various types of moving mechanisms to be utilized to satisfy the nuances of a particular assisted movement: slings, chairs, straps, harnesses and/or transfer sheets may optionally be used. U.S. Pat. No. 8,336,133 B2 is an example of a mobile multifunctional patient transfer device wherein a lift cart is outfitted with a host of optional lift components. Once placed adjacent to a patient bed, said device may act in various capacities and be outfitted to fit a host of desired transfer motions based on the needs of the attendant. Lift components may include frontal bars, table tops, bars, hoists, knee blocks and supports, detachable handles, safety cushion(s) and the like. Said components can assist an attendant in performing frontal transfers, lateral seated transfers, lateral bed transfers, and sit-to-stand transitions based on the needs of the attendant.

U.S. Pat. No. 5,323,498 A provides an example of an elaborate device with a series of boards capable of wedging themselves underneath a patient lying on his or her bed. The device may then tilt and/or lift the patient off of a bed so that the patient may then be placed back on the bed at a different position. Again, like many of the aforementioned mechanisms, the present device needs to be wheeled into a patient's room and subsequently placed adjacent to the bed. Similarly, a four wheeled device shown in U.S. Pat. No. 6,662,388 shows a mechanism placed adjacent to a patient's bed where an elaborate means for moving said patient is accomplished by means of sliding an object between a patient and the bed he or she is laying upon. In this instance, the object is a flat, flexible sheet. The device utilizes a lifting assembly, a base supporting said lifting assembly, a vertically adjustable shaft, a horizontal load-bearing boom-like member for attaching said horizontal load-bearing member and a generally flat, flexible sheet upon which the patient is supported.

Still others accomplish moving and/or lifting a bedridden patient by means of inflation-based technologies. U.S. Pat. No. 7,007,330 B2 is one such example. Here, the device comprises inflation bladders configured to be secured between the patient's body and the patient's bed. The bladders are inflated with pressurized fluid. The configurations of surrounding bladders and the choice of which bladders to inflate determine the direction of movement of the bedridden patient, body-part by body-part. Another, less complex example is seen in U.S. Pat. No. 4,005,498 A. Here the device is a singular inflatable pad having a control pocket formed thereon for receiving a hospital attendant's arm. The pad may be inserted underneath the patient with the control pocket and attendant's arm being positioned above the inflatable pad and in contact with the patient's body. Inflation accomplishes the goal of moving a desired part of the patient's body; such as his or her buttocks, lower back, upper back, upper leg, lower leg, knee(s), arm, head, neck and the like. Still another such example of an inflatable device can be found in U.S. Pat. No. 7,617,553 B1 wherein an inflatable device is used to specifically lift the rectal region of a bedridden patient.

There exists no ultra-portable, ultralight device for moving patients which utilizes jack and jackscrew-based foundational mechanical technologies.

BRIEF SUMMARY

Briefly described, in an example embodiment, the present apparatus and method to overcome the above-mentioned disadvantage, and meet the recognized need for a body lift, positioning, propping and securing device and methods of use comprising, in general, a configured cushion(s) or series of fitted cushions induced to partially fit in an angle adjustable mount or cradle which itself may be bolted to a modified mechanical screw-type jack configured to attach to a base plate which lays flat on the patient's bed. The mount or cradle may be comprised of carbon fiber, aluminum or similar ultra-light and strong substance known in the field. The internal cradle may be shaped like a rectangular five-sided box that accepts a foundational cushion with a rectangular bottom that hangs over the internal cradle. A plurality of cushion(s) may each be respectively dimensioned to accommodate a person's back, torso, shoulder, hips, legs, and feet wherein at least one curved cushion(s) adjoined to a cradle rests upon a specified and targeted patient body part. A nurse or any patient attendant may reposition and secure the laying person into a series of desired body positions using a system comprised of a modified mechanical jack and the adjoining cradle and interchangeable cushion(s). Service personnel may reposition a bedridden person by using the mechanical jack, adjoining cradle and cushion(s) to reposition, prop and secure the laying patient from a supine or prone laying position into a new position wherein one or more body parts are lifted, raised and secured by the device. The device once set, prevents the patient from moving from side-to-side, rolling or otherwise shifting into a position not in keeping with the attendant's desires.

In an exemplary embodiment, a body lift and positioning device and methods of use, the apparatus including a base, a joint, for example, a radial adjustment head, a mechanical jack, an internal cradle and one or more cushion(s) dimensioned to conform and contour to a particular patient body part thereon. The method including the steps of providing a body lift and positioning apparatus, the apparatus having a base capable of moving, for example, repositioning, on a bed, a mechanical jack capable of being lifted and lowered by means of a rotational device, for example, a socket driver, and contoured cushion(s) configured to fit a particular body part of a person, for example, an immobile or obese patient.

In still a further exemplary embodiment of the invention, the cushion(s) is contoured to fit underneath a patient's back. In some embodiments of the invention a plurality of cushions may be fitted onto one another and configured to conform to a patient's torso for tilting sideways. In some scenarios, for the purposes of storage and transport the cushions may seat into each other making it possible to move many body parts yet still fit the cushions in a relatively small duffel bag. In some embodiments of the invention a plurality of cushions may be fitted into one another and configured to conform to the bottom of a patient's legs to aid in circulation by raising the legs above the heart. In yet another embodiment of the invention a cushion(s) may be fitted in order to facilitate propping a patient on their side to aid in changing bed pans.

In a method of assembly of an exemplary embodiment of the device, an attendant may attach the bottom of the mechanical screw-type jack to pegs resting on the top center of a large base plate at 90 degree angles. The jack may be attached to the base plate and the joint or radially adjustable accepter head may be attached to the end of the jack's lever arm via carriage bolts (if it wasn't left on by the last user and therefore already attached to the lift). Next, the cushion mount or cradle may serve as an internal skeleton to give a cushion strength and stability as well as to give the cushion a hard upper platform to be inserted into the lift and an angle may be selected for the cradle by way of the radial adjustment head using a ball lock pin. In some embodiments, the mount's upper platform may include slots or cavities configured to receive protrusions or columns extending from the cushion(s) to secure the cushion(s) to the cradle or mount. For example, the cushion or plurality of cushions may be fitted together and attached to the cushion cradle by way of columns at the bottom of the cushions that fit into the cradle for a snug fit. Last, an attendant may select the appropriate cushion(s) or plurality of cushions. The attendant or attendants may move the device across the bed and place it partially underneath and/or adjacent to the body part that the attendant wishes to lift and prop. The attendant or attendants may manually move the patient using a strap or sling or by means of their hands alone in order to place the lift under the patient. The movement however, will be minimal in that lifting the body part may be necessary to the extent that said body part can be placed upon the lowest setting of the mechanical jack. Once the base, lifting unit, adjustable head, cradle and appropriate cushion(s) are assembled the attendant may place the appropriate patient body part or region into the appropriate cushion(s) (top portion of the assembled device) and then, using a rotational device, for example, a powered socket driver, lift the patient's body part to any desired height within the range of the jack's capabilities.

Accordingly, a feature of the medical lift and positioning device and methods of use is its ability to enable a single attendant to comfortably maneuver, reposition, roll, lift and/or prop a body part of a large bedridden patient with no other tool needed. In some embodiments, only an accompanying strap is needed to comfortably maneuver, reposition, roll, lift and/or prop a body part of a large bedridden patient. The device itself may be designed for such ease of maneuverability. Moreover, multiple devices may be used to lift and prop more than one patient body part at a time, for example, with a bench accessory that straddles the two lifts.

Another feature of the medical lift and positioning device and methods of use is its ability to provide an efficient, lightweight, highly maneuverable and safe apparatus for the lifting, propping and repositioning of patients, for example, bedridden patients.

Another feature of the medical lift and positioning device and methods of use is a high friction rubber sheet at the bottom of the front base which enables the lift to grip the sheets. In some examples, a high-friction spray may be applied to the bottom of the front base to allow the lift to grip the sheets.

Another feature of the medical lift and positioning device and methods of use is its ability to aid healing by holding broken bones and muscles, for example, arm muscles, at specified heights and angles securely in a body part contoured cushion attached to the lift.

Still another feature of the medical lift and positioning device and methods of use is its ability to enable a single person to quickly and/or efficiently prop a bedridden patient on either of the patient's sides (e.g. to turn the patient) to maintain patient comfort, facilitate patient examination, and to prevent bed sores from forming.

Yet another feature of the medical lift and positioning device and methods of use is its ability to provide a compact, disassemble able, light and portable apparatus that is easily stored and transported to the patient's home or hospital room.

Yet another feature of the medical lift and positioning device and methods of use is its ability to aid in drinking and eating by lifting a patient to prone position without the need to use expensive hospital lift beds.

Yet another feature of the medical lift and positioning device and methods of use is its ability to assist with bedridden patient rolling, positioning, repositioning, and tilting from side-to-side as well as its ability to position, reposition and tilt a particular body part of a patient at various angles between the horizontal and vertical axis.

Yet another feature of the medical lift and positioning device and methods of use is its ability to relieve stress on the fingers, hands, arms, back, shoulders and wrists of the caregiver, especially when the patient is heavy.

Yet another feature of the medical lift and positioning device and methods of use is its ability to accommodate different sized bedridden patients.

Yet another feature of the medical lift and positioning device and methods of use is its ability to conform to a side laying patient's back, shoulder, torso, hips, and upper legs.

Yet another feature of the medical lift and positioning device and methods of use is its ability to aid during physical therapy activities by using a rotational motor to flex body parts (e.g. calves) to and fro to provide blood flow and muscle growth.

Yet another feature of the medical lift and positioning device and methods of use is the ability to easily disinfect the material used to form the lift and the cushions with over the counter cleaning sprays or liquids. For example, the lift may be formed of a metal or carbon fiber material and the cushions may be formed of ethylene-vinyl acetate (EVA), which may be easily disinfected by users, for example, a nurse or medical assistant. This may prevent the passage of viruses and other diseases from patients to medical personnel such as nurses.

Yet another feature of the medical lift and positioning device and methods of use is its ability to provide a low-cost alternative to systems for lifting, propping, securing and turning a bedridden patient, such as, mechanical means for lifting and turning, including mechanical rollers supported by a stationary or moveable support structure positioned above a hospital bed.

Yet another feature of the medical lift and positioning device and methods of use is its ability to provide a support assembly capable of supporting a bedridden patient in an angled position on their side to enable additional positions to rest on their side to reduce bed sores and to increase comfort of the bedridden patient.

Yet another feature of the medical lift and positioning device and methods of use is its ability to be placed at the foot of the bed on the floor, for example, at a user's home. For example, the device may be placed adjacent to a bed to support the head and/or neck of the user by use of a cushion configured for use with a face down patient, allowing the user's spine to properly align after height adjustment.

Yet another feature of the medical lift and positioning device and methods of use is its ability to be utilized with existing beds or bed frames.

Yet another feature of the medical lift and positioning device and methods of use is its ability to be easier, less expensive, smaller, lighter and simpler to use than existing technology.

Yet another feature of the medical lift and positioning device and methods of use is its independence from attachment to a ceiling, wall or floor thereby making the device capable of being freely transported and used in a wide variety of environments, including, for example, outside, on the ground, to aid a bleeding soldier by elevating the bleeding injury above the soldier's heart.

Yet another feature of the medical lift and positioning device and methods of use is its ease of assembly and disassembly and its ability to fit under a bed, or in a duffel bag for easy transport.

Yet another feature of the medical lift and positioning device and methods of use is its ability to prevent disease spread by providing medical personnel, for example, nurses, with a means to move and hold a patient without the use of the patient's or their own hands, arms or chests.

These and other features of the medical lift and positioning device and methods of use will become more apparent to one skilled in the art from the following Detailed Description of the Embodiments and Claims when read in light of the accompanying drawing Figures.

BRIEF DESCRIPTION OF THE DRAWINGS

The present medical lift and positioning device and methods of use will be better understood by reading the Detailed Description of the embodiments with reference to the accompanying drawing figures, in which like reference numerals denote similar structure and refer to like elements throughout, and in which.

Figure 2:
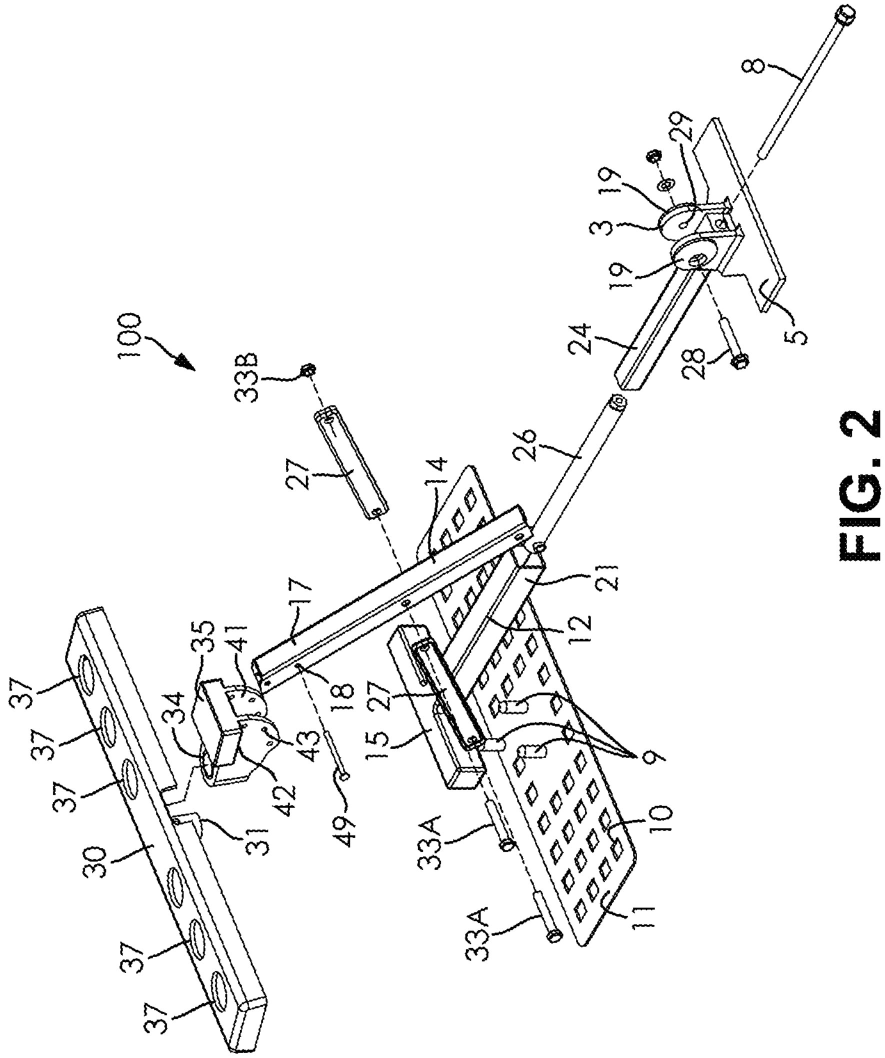
FIG. 2 is an exploded view of an example embodiment of the medical lift and positioning device assembly.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION OF THE DRAWINGS

In describing the exemplary embodiments of the present disclosure, as illustrated in FIGS. 1-14 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

In accordance with embodiments of the present invention, a lift and positioning device 100 may include a base 11, a lift 14, a joint or radial adjustment head 41, and a cushion mount 30. In some embodiments, the height of the lift 14 is adjustable. In some embodiments, the lift 14 is formed as a bypass and is configured to maintain a static height. The bottom of the bypass may be configured with attachment points for connection of the bypass to the base 11. For example, the attachment points may be holes or openings configured to receive the pegs 9 disposed on the base 11.

Figure 1:
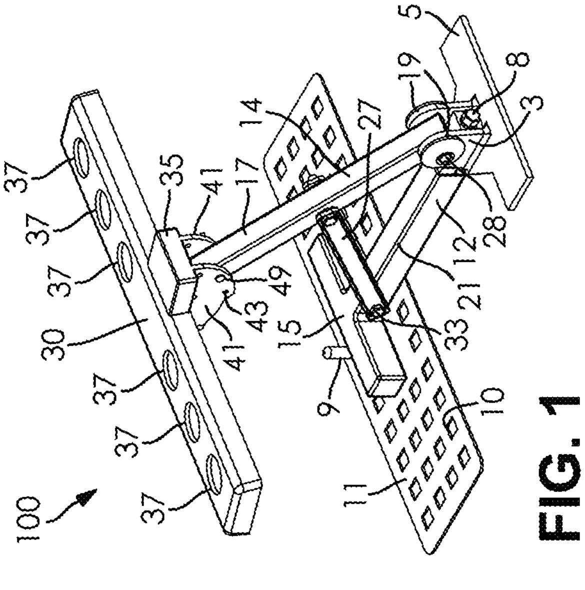
FIG. 1 is a perspective view of an example embodiment of the medical lift and positioning device assembly in its expanded position, showing the base attached to a lift or mechanical jack.
Figure 3:
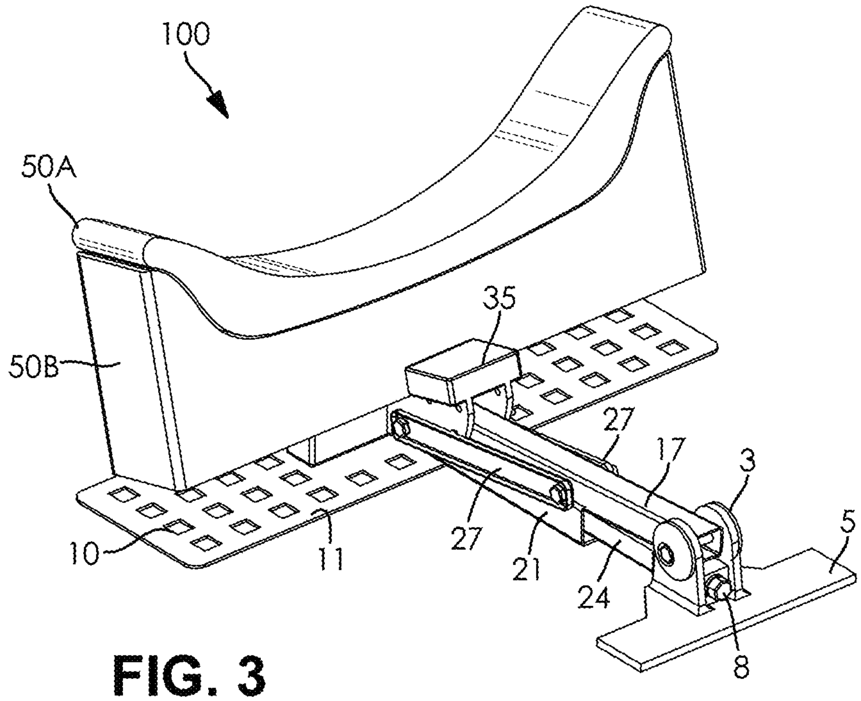
FIG. 3 is a perspective view of an example embodiment of a tilting torso medical lift and positioning device assembly in its collapsed position, showing a tilted torso cushion seated inside an upper back cushion coupled to the lift in accordance with an embodiment of the present invention.
Figure 4:
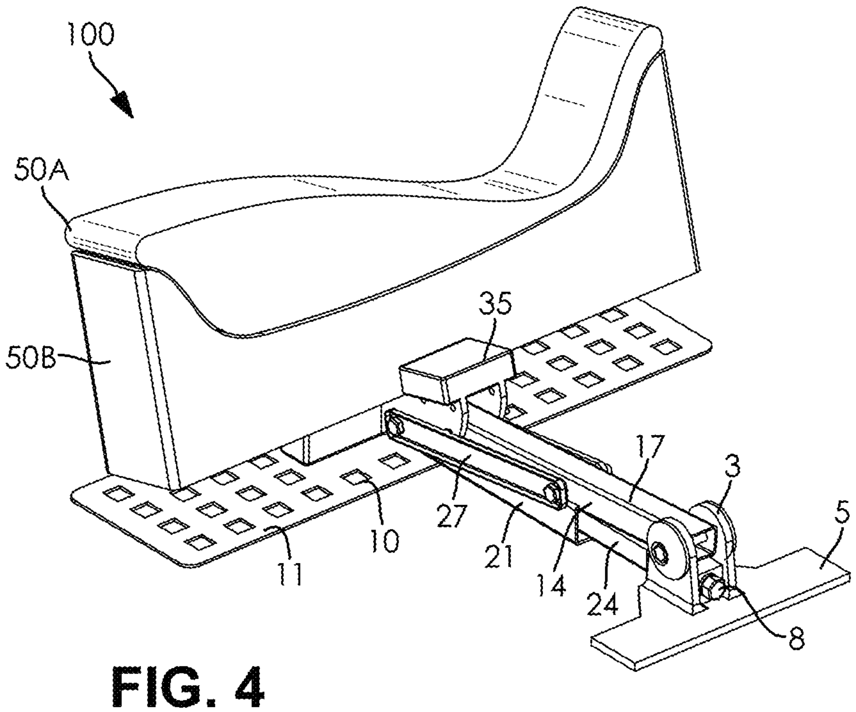
FIG. 4 is a perspective view of an example embodiment of the medical lift and positioning device assembly in its collapsed position, showing an arm cushion seated inside an upper back cushion coupled to the lift in accordance with an embodiment of the present invention.
Figure 5:
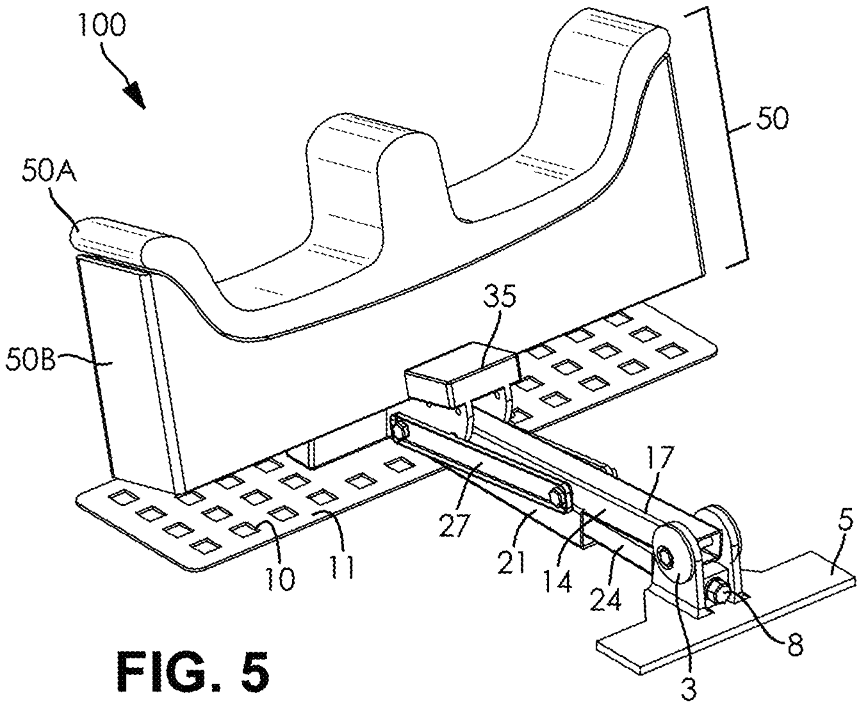
FIG. 5 is a perspective view of an example embodiment of the medical lift and positioning device assembly in its collapsed position, showing a leg cushion seated inside an upper back cushion coupled to the lift in accordance with an embodiment of the present invention.
Figure 6:
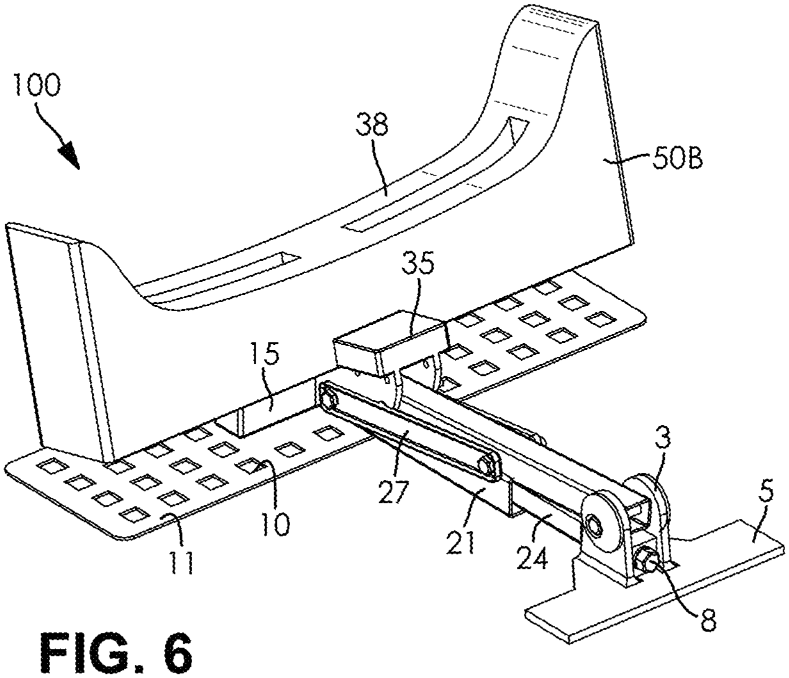
FIG. 6 is a perspective view of an example embodiment of the medical lift and positioning device assembly in its collapsed position, showing an upper back cushion coupled to the lift in accordance with an embodiment of the present invention.
Figure 7:
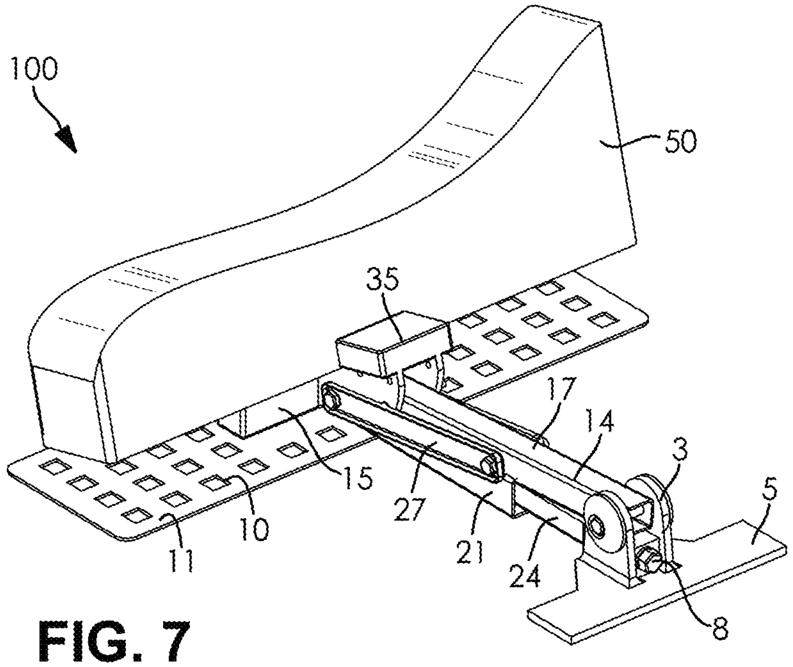
FIG. 7 is a perspective view of an example embodiment of the medical lift and positioning device assembly in its collapsed position, showing a horizontal turning cushion coupled to the lift in accordance with an embodiment of the present invention.
Figure 8:
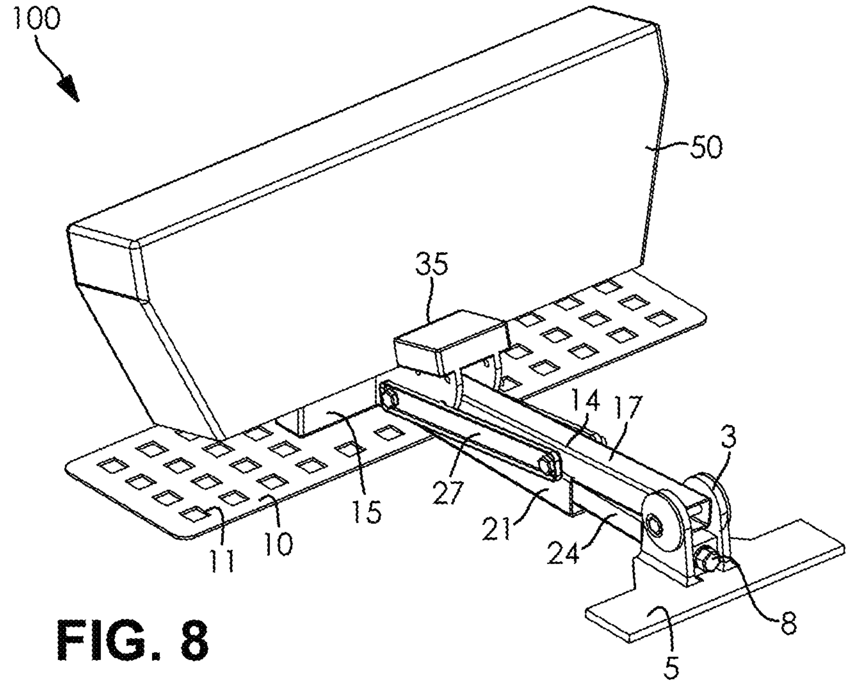
FIG. 8 is a perspective view of an example embodiment of the medical lift and positioning device assembly in its collapsed position, showing an ankle and calf flex cushion coupled to the lift in accordance with an embodiment of the present invention.
Figure 9:
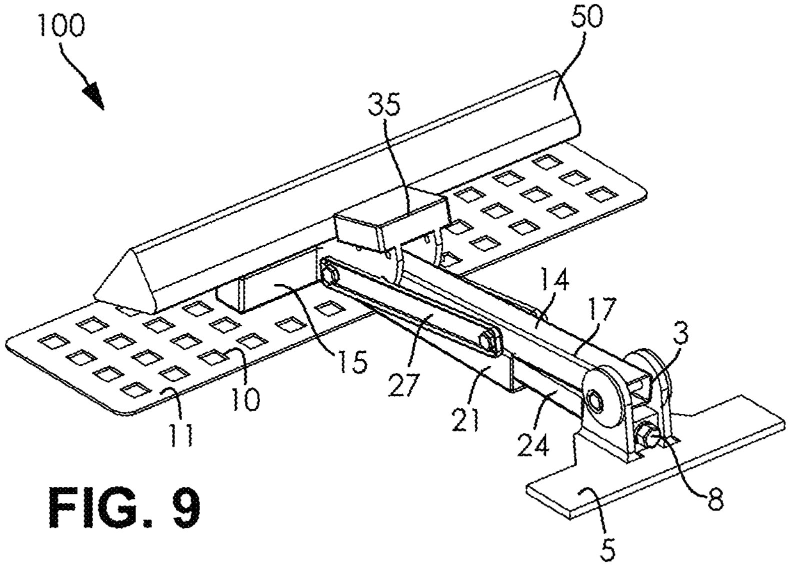
FIG. 9 is a perspective view of an example embodiment of the medical lift and positioning device assembly in its collapsed position, showing a therapy wedge cushion coupled to the lift in accordance with an embodiment of the present invention.
Figure 10:
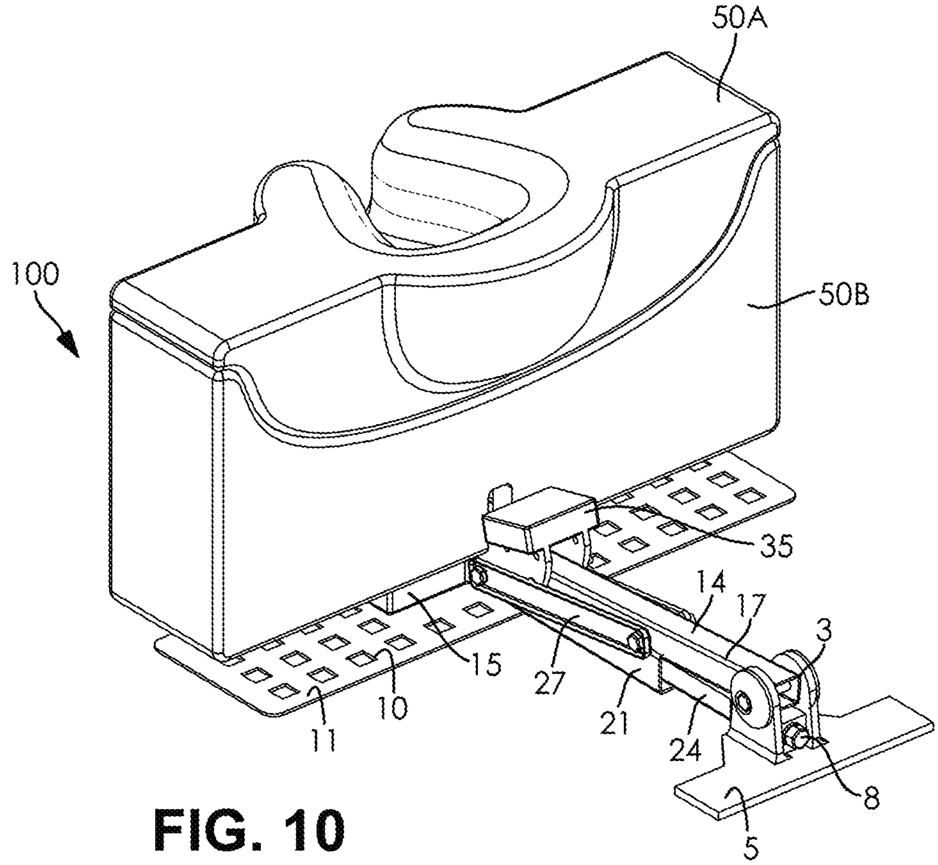
FIG. 10 is a perspective view of an example embodiment of the medical lift and positioning device assembly in its collapsed position, showing a "face down" spine aligning cushion coupled to the lift in accordance with an embodiment of the present invention.
Figure 12A:
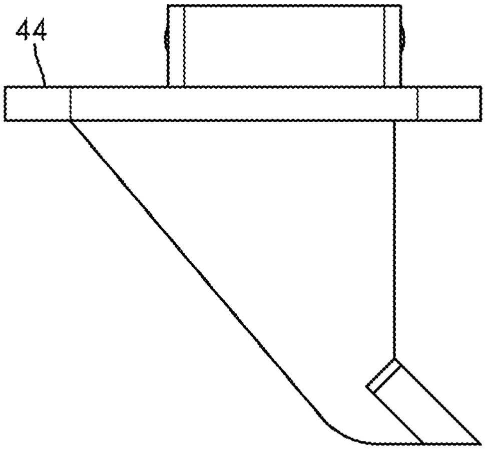
FIG. 12*a* is a side view of a first exemplary embodiment of a ground spike for a medical lift and positioning device assembly, in accordance with an embodiment of the present invention.
Figure 12B:
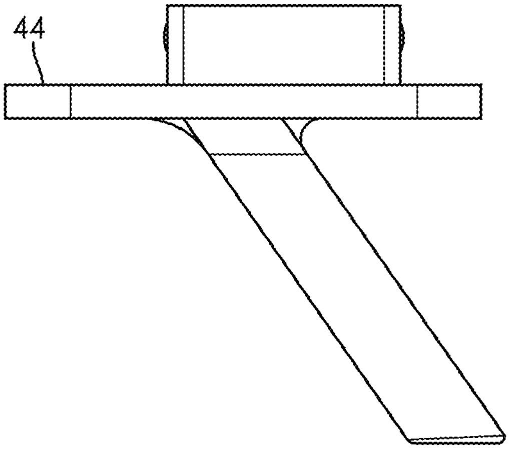
FIG. 12*b* is a side view of a second exemplary embodiment of a ground spike for a medical lift and positioning device assembly, in accordance with an embodiment of the present invention.
Figure 12C:
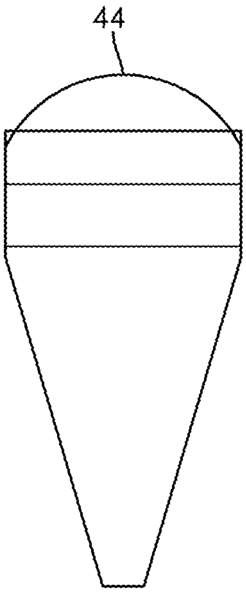
FIG. 12*c* is a side view of a third exemplary embodiment of a ground spike for a medical lift and positioning device assembly, in accordance with an embodiment of the present invention.

Referring now to FIG. 1, by way of example, and not limitation, there is illustrated an exemplary embodiment of the medical lift and positioning device 100. As shown in FIG. 1, the medical lift and positioning device 100 may include a front base or base plate 11. The front base 11 may be rectangular in shape and horizontally configured to lay at rest upon a bed (not shown here). In any embodiment, the base or base plate 11 may be formed in any suitable shape including, for example, circular, oval, square, diamond or hexagonal. In an exemplary embodiment, the base plate 11 may be thin and configured to approximate 6 inches wide and 16 inches in length. The configuration is subject to change within a range reasonable to one skilled in the art. The base plate 11 may be made from any single or combination of sturdy materials, such as carbon fiber, polymer, resin, and plastic, Kevlar, forged metals, wood and the like. In some embodiments, the base 11 may be permanently attached to the lift 14. In some embodiments, the base 11 may be releasably attached to the lift 14. In some embodiments, the lift 14 may be configured to swivel or rotate relative to the base 11. In some embodiments, the base 11 may include one or more lift attachment points. In some embodiments, the lift attachment points may be configured as pegs 9. In some embodiments, the pegs 9 may be bullet shaped. In some embodiments, the base plate 11 may be formed with a plurality of perforations 10. In some examples, the perforations 10 may be configured to receive spike members 44 (shown in FIGS. 12*a*-12*c*) adapted to secure the base 11 to a support surface, for example, a field, while the device 100 is in use. The spike members 44 may be formed with a sharp end and an attachment end. The sharp end may be configured to be inserted into the support surface, for example, a field or section of the ground, and the attachment section may be inserted into a perforation 10 to connect the spike member 44 to the bottom of the base 11. In some embodiments, the attachment section of the spike members 44 includes a pair of tabs configured to pinch a perforation side wall in order to reversibly secure a spike member 44 to the perforation 10. As shown in FIGS. 12*a*-12*c*, the spike members 44 may be configured in a plurality of configurations wherein the top end of the spike member 44 is formed with an attachment component and the bottom end is formed with a sharp component.

Upon the base plate 11 may lay the lift 14. In some embodiments, the mechanical jack or "lift" 14 may be reversibly coupled to the base plate 11. In accordance with embodiments of the present invention, the lift 14 may comprise a lower support member 12, a screw 8, a rear base 5, a pivot module 3, a lever arm 17, and one or more bracket members 27. In some embodiments, the lift 14 may include a joint 35 configured to connect to a cushion mount 30.

FIG. 2 shows an exploded view of an example embodiment of the medical lift and positioning device assembly. As shown in FIG. 2, the lower support member 12 part of the lift 14 may reversibly couple to the base plate 11. The lower support member 12 may comprise one or more legs or bars. A first leg 15 may have one or more holes (not shown) on its bottom wherein one or more pegs 9 of the base 11 may be fitted in the first leg 15. As shown in the depicted example, the support section may be "T" shaped. For example, protruding from a middle section of the first leg 15 may be a second leg 21. In any embodiment, the support section may be formed in any other configuration suitable of supporting the lift 14.

As further shown in FIG. 2, the second leg 21 of the lower support member 12 is configured as a shaft having one or more telescoping components. For example, the second leg 21 may be formed as an external shaft and may house an internal shaft 24 which may be extended or shortened as it protrudes from the second leg 21. In some embodiments, the internal shaft 24 may include a hollow internal component 26, for example, a hollow internal chamber having an internal threaded portion.

In accordance with embodiments of the present invention, the screw 8 of the lift 14 may be formed with an external threaded portion adapted to engage with an internal threaded portion within the lower support member 12. For example, the screw 8 may be configured to engage with the internal thread of the hollow internal chamber 26. In accordance with embodiments of the present invention, the lift may be moved from a first position, wherein the lift is in its collapsed form (as shown in FIGS. 3-10, for example), to a second position, wherein the lift is in its partially to fully expanded position (as shown in FIG. 1, for example), by threadably engaging the screw 8 with the internal chamber 26 of the lower support member 12, for example, by rotating or tightening the screw 8, to draw the internal shaft 24 towards the external shaft 21 and direct the rear base 5, which is disposed a distance away from the front base 11, closer towards the front base 11. In any embodiment, the screw 8 may be replaced with a similarly suitable adjustment member similarly capable of adjusting the length of the telescoping components of the lower support member 12 to draw the rear base 5 towards the front base 11.

In accordance with embodiments of the present invention, the device 100 may include a rear base 5. In some embodiments, the rear base 5 is disposed a distance from the front base 11, and includes a pivot module 3. The rear base 5 may further be coupled to the rear section of the lower support member 12.

In accordance with embodiments of the present invention, the device 100 may include a pivot module 3. In some embodiments, the pivot module 3 may include a pivot axis 29 about which the lever arm 17 may rotate or pivot. The pivot module 3 may comprise a pair of opposing plates 19 configured to flank the lever arm 17. In some embodiments, the lever arm 17 may be disposed between the opposing plates 19, and may be pivotally fastened at the pivot axis 29 to each of the plates 19 of the pivot module 3 by use of a bolt, screw, pin, for example, a ball lock pin, or any other similarly suitable removable fastener. In the depicted example, a bolt 28 and nut 29 are used to pivotally connect the lever arm 17 to the pivot module at the pivot axis 29. In the illustrated example, a lower portion of the lever arm 17 is pivotally connected to the pivot module 3 and an upper portion of the lever arm 17 is operably connected to the mount joint 35. The mount joint 25 may be referred to herein as the radial adjustment head. In any embodiment, any similar pivotable attachment means capable of permitting the lever arm 17 to pivot about the pivot axis 29 may be used to facilitate the pivoting movement of the lever arm 17 about the pivot axis 29.

In accordance with embodiments of the present invention, the lift 14 of the device 100 may include one or more bracket members 33. As shown in FIGS. 1-10, a pair of bracket members 27 may flank the second leg 21. The pair of bracket members 27 may each pivotally attach at a first point to a front section of the second leg 21 and at a second point to a middle section of the lever arm 17. In some embodiments, connector members connect the bracket members 27 to the second leg 21 and the lever arm 17. In some embodiments, the connector members may be bolts 33*a* and nuts 33*b*. In any embodiment, other suitable connector members, including screws, pins, for example, ball lock pins, and similar connectors may be used to pivotally connect the bracket members 27 to the second leg 21. In some embodiments, the bracket members 27 define a movement boundary for the lever arm 17. For example, the bracket members 27 may permit the lever arm 17 to pivot about the pivot axis 29 of the pivot module 3 within the range delineated by the bracket members 27.

In accordance with some embodiments of the present invention, the lift 14 may include a joint 35. The joint 35 may be operably connected to a top portion of the lever arm 17. In some embodiments, the joint 35 connects the lever arm 17 to the cushion mount 30. For example, the joint 35 may include an opening or slot 34 which corresponds in shape and size to the protruding portion 31 disposed on a bottom side of the mount 30, the slot 34 and the protruding portion 31 adapted to secure the mount 30 to the joint 35. In some embodiments, the joint 35 is fixed. In some embodiments, the joint 35 is radially adjustable. For example, the angle of the joint 35 may be changed to adjust the angle of the cushion mount 30. The joint may include a pair of opposing side walls 41 which flank the lever arm 17. Each side wall 41 may include one or more slots or holes configured to align with matching slots or holes 18 on the lever arm 17. As shown in FIG. 2, a first pair of slots 42 in each of the side walls 41 may be configured as a pivot point for the lever arm 17, while the remaining slots 43 may be configured as angle adjustment points for the joint 35. Pins 49, for example, ball lock pins, may be inserted into the holes 42 and 43 in the side walls 41 of the joint 35, as well as the holes in the lever arm 17 disposed between the side walls 41 in order to reversibly lock joint 35 in a selected position. For example, a first ball lock pin 49 may be configured as a pivot pin, around which the joint 35 may be configured to pivot. A second ball lock pin 49 may be configured as an angle locking pin, which may be used to lock the joint 30 in a selected position or angle relative to the lever arm 17. To change the angle of the joint 35, the angle locking pin 49 may be removed to enable free movement of the joint 35, and the angle locking pin 49 may be inserted into the holes 42 in the joint side walls 41 and the holes 18 in the lever arm 17 which correspond to a second or new joint angle.

Note that the lift, like the base plate, as well as any of its component parts may be made from any single or combination of sturdy materials, such as carbon fiber, polymer, resin, plastic, Kevlar, forged metals, wood and the like.

Figure 13:
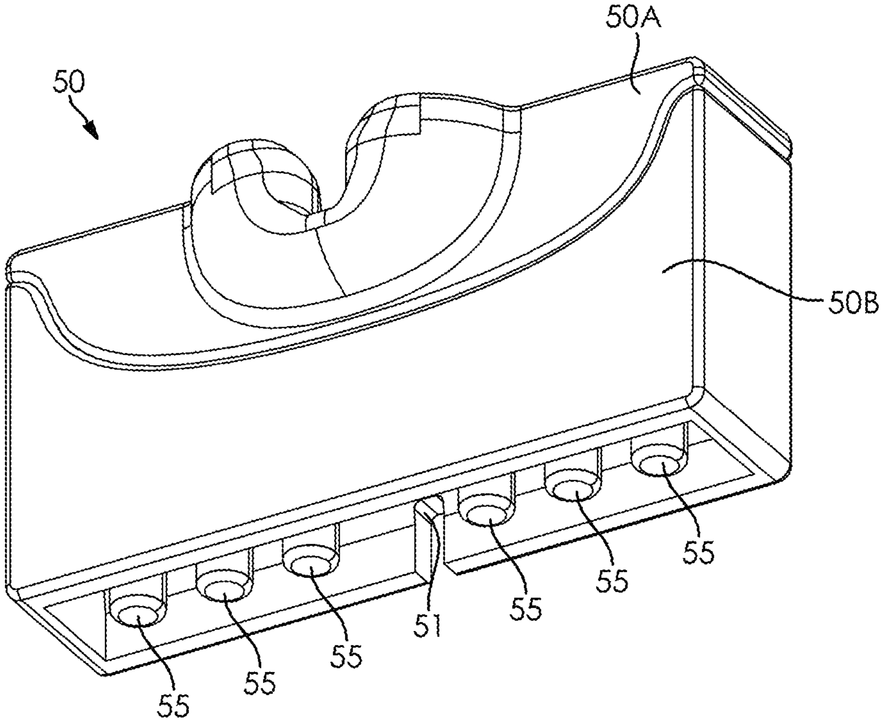
FIG. 13 is a bottom perspective view of an exemplary "face down" spine aligning cushion, in accordance with an embodiment of the present invention.

In accordance with embodiments of the present invention, the lift and positioning device 100 may include a cushion mount 30. The cushion mount 30 may include a protruding portion 31 corresponding in shape and size to an opening or slot 34 in the joint 35. Connection of the protruding portion 31 with the opening or slot 34 facilitates the secure connection of the mount 30 with the joint 35. In some embodiments, the mount 30 may be configured as an elongate bar. The mount 30 may include one or more cushion connection points adapted to connect a cushion 50 to the mount 30. For example, the mount 30 may include one or more slots or hollow spaces 37, for example, circular hollow slots, adapted to engage with and snugly fit the tubular-shaped protruding components 55 (as shown in FIG. 13) formed on a bottom side of the cushions 50.

Like the base plate and the lift, the mount may be made from a host of sturdy materials, such as carbon fiber, polymer, resin, and plastic, Kevlar, forged metals, wood and the like.

Figure 11:
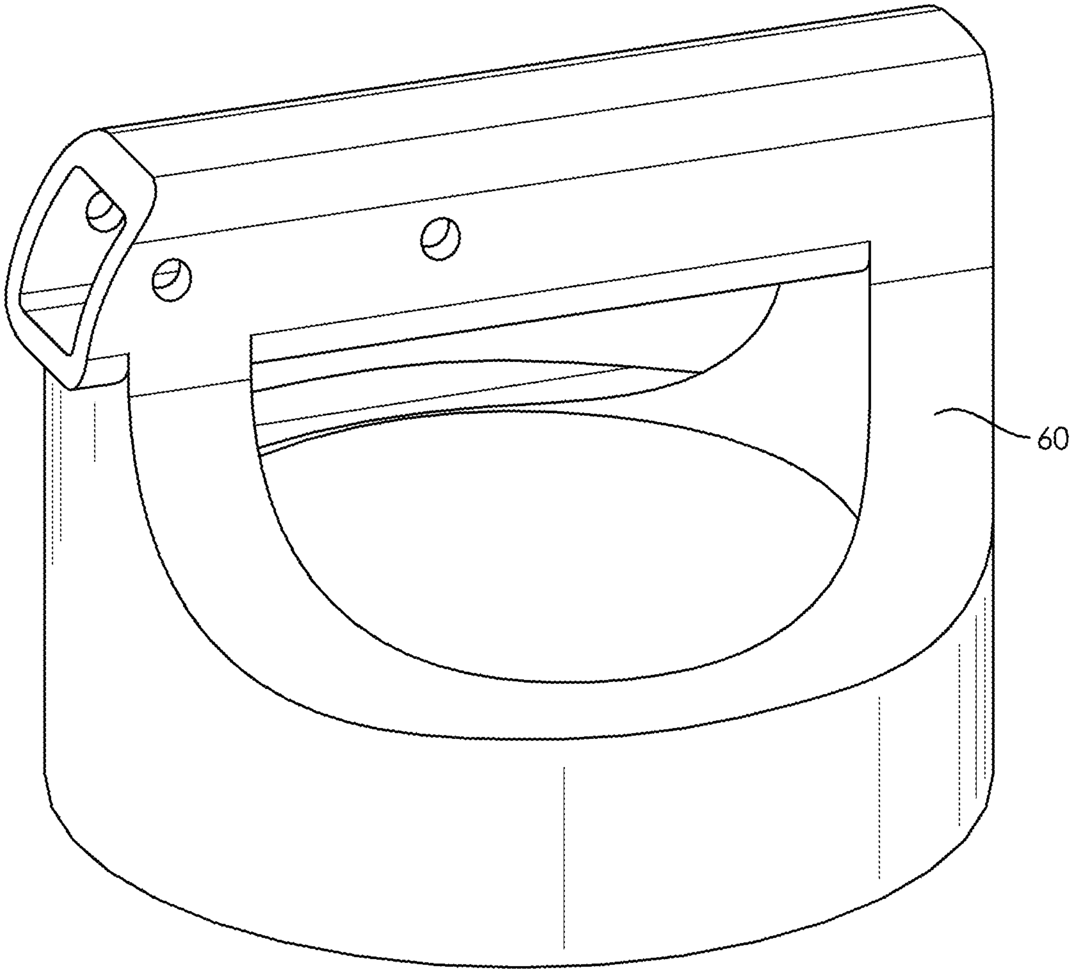
FIG. 11 is a perspective view of an example embodiment of a bypass for a medical lift and positioning device assembly, in accordance with an embodiment of the present invention.

FIG. 11 is a perspective view of an example embodiment of a bypass for a medical lift and positioning device assembly, in accordance with an embodiment of the present invention. As shown in FIG. 11, in some embodiments, the bypass 60 may be configured to maintain a static height. In some embodiments, the bottom of the bypass 60 may be configured with attachment points for connection of the bypass 60 to the base 11. For example, the attachment points may be holes or openings configured to receive the pegs 9 disposed on the base 11 (as shown in FIG. 1).

In accordance with embodiments of the present invention, the lift and positioning device 100 may be configured to couple to one or more cushions 50. In some scenarios, the cushions 50 may be configured to fit over the cushion mount 30. For example, a bottom side of the cushions 50 may be formed with a cavity adapted to house at least a portion of the cushion mount 30. As shown in FIG. 13, in some embodiments, one or more protruding connectors, for example, one or more tubular-shaped protruding components 55, on the bottom side of the cushions 50 may fit snuggly into one or more slots or hollow spaces 37, for example, circular hollow slots, in the mount 30. In accordance with embodiments of the present invention, this configuration of the tubular-shaped protruding components 55 in the cushions which correspond to the slots or hollow spaces 37 in the mount 30 facilitates the easy attachment and securement of a cushion or cushions 50 to the mount 30 without the need for bolts, pins, snaps or ties that make assembly complex and time consuming. In some embodiments, one or more side walls of the cushions 50 may be formed with a hollow cavity, within which the one or more protruding connectors, for example, one or more tubular-shaped protruding components 55, may be disposed. In some scenarios, the hollow cavity creates internal walls which are adapted to frame the one or more external walls of the mount 30 when the cushion or cushions 50 are installed upon the mount 30.

Figure 14:
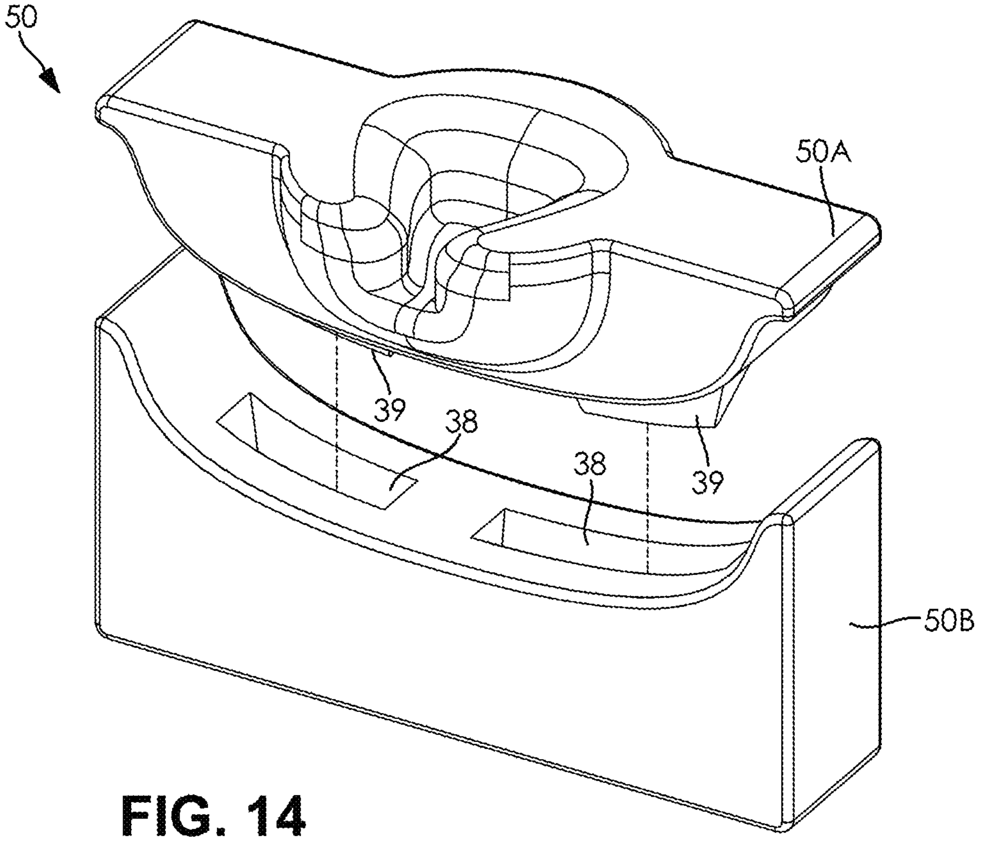
FIG. 14 is a perspective view of an exemplary disassembled "face down" aligning cushion, in accordance with an embodiment of the present invention.

As shown in FIGS. 3-10, in accordance with some embodiments of the present invention, a cushion 50 may be comprised of one or more cushion members. For example, a cushion 50 may be comprised of a top cushion member 50*a* and a bottom cushion member 50*b*. As shown in FIGS. 13-14, in some embodiments, a bottom side of the bottom cushion member 50*b* includes a gap 51 adapted to connect with the cushion mount 30 or the joint 35 in order to secure the cushion 50 to the mount 30 or the lift 35, respectively. As further shown in FIGS. 13-14, in some examples, a top side of the bottom cushion member 50*b* may include one or more block slots 38 which correspond to, and are configured to secure to, protruding blocks 39 disposed on the bottom side of the top cushion member 50*a*. In some examples, the connection of the protruding blocks 39 to the block slots 38 assists in securing the top cushion member 50*a* to the bottom cushion member 50*b*.

As further shown in FIGS. 3-10, the cushions 50 may be configured in a plurality of suitable shapes in order to support various patient body parts in various patient positions. For example, a top side of the cushion may be configured with one or more undulations configured to receive, position, or lift a patient arm. Any portion of cushion may be formed with one or more undulations configured to receive, position or lift a patient head, hip, neck, foot, or any other patient body part.

The cushions 50 used in conjunction with the lift and positioning device may be made from any substance known in the art such as ethylene-vinyl acetate (EVA), viscoelastic orthopedic and posturepedic memory foams, spring cushions, Low-resilience polyurethane, Sorbothane, Neoprene and the like.

Figure 15:
FIG. 15 depicts an example embodiment of a medical lift and positioning device assembly in use, wherein an exemplary arm cushion is seated inside an exemplary upper back cushion which may be coupled to the lift to prop up or support an arm of a user in accordance with an embodiment of the present invention.
Figure 16:
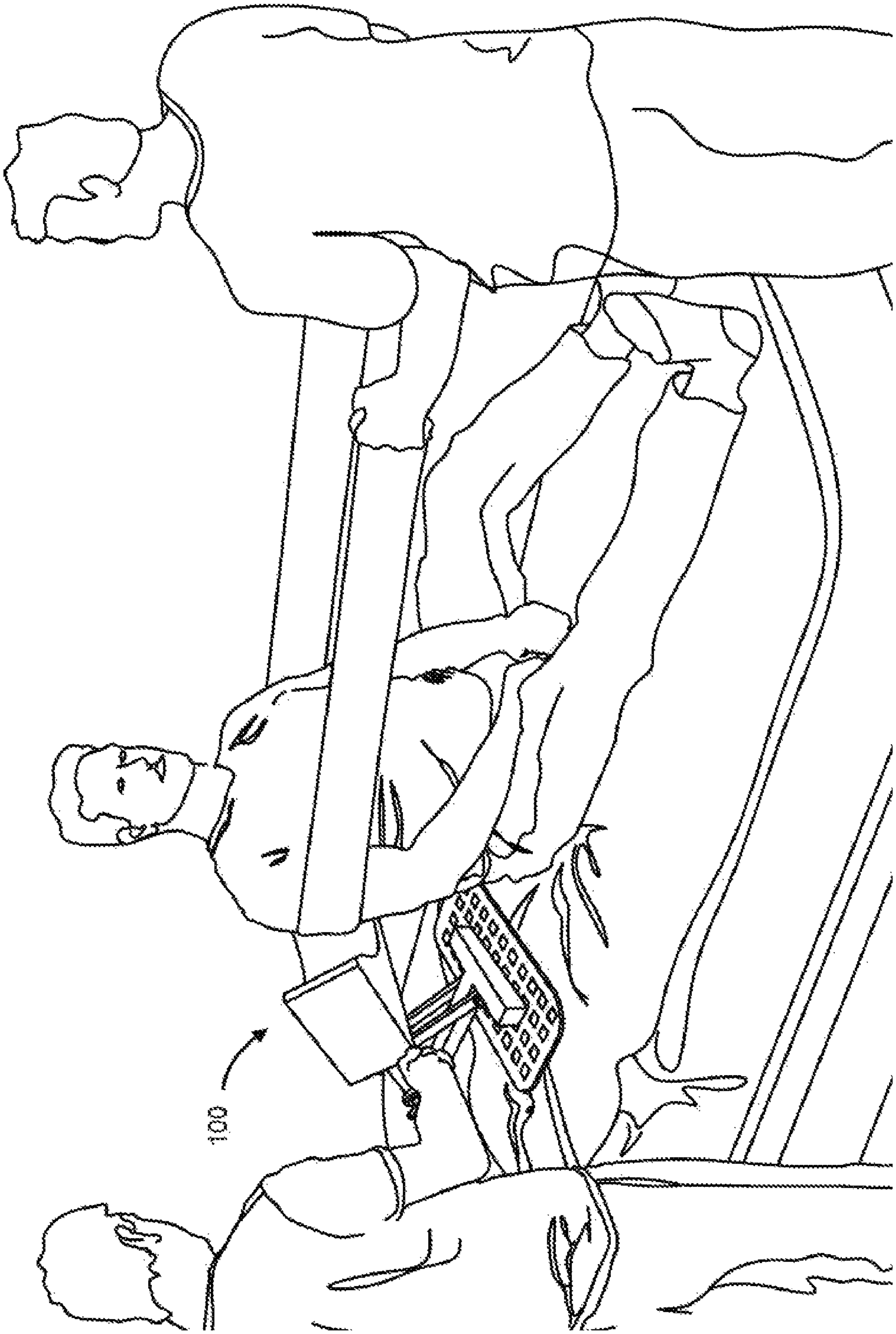
FIG. 16 depicts an example embodiment of a tilting torso medical lift and positioning device assembly in use, wherein an exemplary a tilted torso cushion is seated inside an upper back cushion which may be coupled to the lift and used to support a user back in accordance with an embodiment of the present invention.
Figure 17:
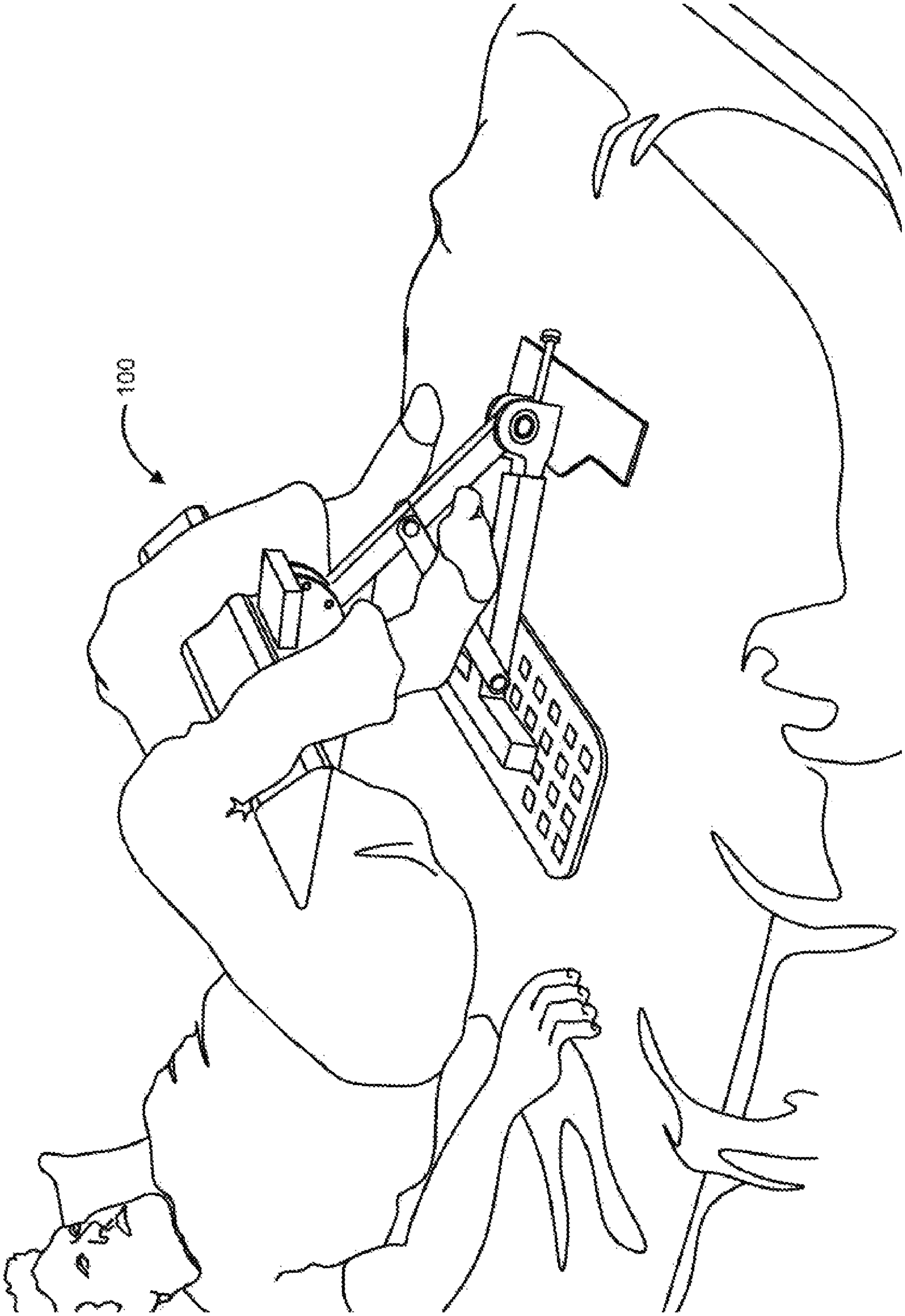
FIG. 17 depicts an example embodiment of a medical lift and positioning device assembly in use, wherein an exemplary therapy wedge cushion is coupled to the lift to support user legs in accordance with an embodiment of the present invention.
Figure 18:
FIG. 18 depicts an example embodiment of a medical lift and positioning device assembly in use, wherein an exemplary horizontal turning cushion is coupled to the lift to position or support a user back in accordance with an embodiment of the present invention.

FIGS. 15-18 demonstrate various exemplary usage scenarios of the lift and positioning device 100. Specifically, FIG. 15 depicts an example embodiment of a medical lift and positioning device assembly 100 in use, wherein an exemplary arm cushion 50*a* is seated inside an upper back cushion 50*b* which may be coupled to the lift 14 to support a user arm, in accordance with an embodiment of the present invention. FIG. 16 depicts an example embodiment of a tilting torso medical lift and positioning device assembly 100 in use, wherein an exemplary tilted torso cushion 50*a* is seated inside an upper back cushion 50*b* which may be coupled to the lift 14 and used to support a user back, in accordance with an embodiment of the present invention. FIG. 17 depicts an example embodiment of a medical lift and positioning device assembly 100 in use, wherein an exemplary therapy wedge cushion 50 is coupled to the lift 14 for use in supporting user legs in accordance with an embodiment of the present invention. FIG. 18 depicts an example embodiment of a medical lift and positioning device assembly 100 in use, wherein an exemplary horizontal turning cushion 50 is coupled to the lift 14 to support a user back in accordance with an embodiment of the present invention.

As shown in FIGS. 15-18, in some exemplary usage scenarios, the lift and positioning device 100 may be utilized by placing the device 100 on a support surface, for example, a bed. In some scenarios, the device may be placed on the support surface in its first position, for example, in its collapsed form (as shown in FIGS. 3-10). In its collapsed form, the device 100 may easily be placed under the patient, for example, under a selected patient body part, for example, a patient leg. Once positioned in a selected location, the device 100 may be selectively expanded by a medical professional, for example, a nurse, doctor, or medical assistant.

In another exemplary usage scenario, the lift and positioning device 100 may be utilized by placing the front base 11 and rear base 5 of the device 100 on the footboard of a bed so that the device 100 may be used to expand towards a patient's feet.

Further in an exemplary usage scenario, the device 100 may be expanded to lift, prop, or otherwise re-position a patient by rotating or tightening the screw 8 disposed at the rear section of the lower support member 12. For example, rotating the screw 8 engages the internal threads of the internal chamber 26, to draw the screw 8 towards the front section of the lower support member 12, such that the internal shaft 24 is likewise drawn towards the external shaft 21 to decrease the distance between the rear base 5 and the front base 11. In some embodiments, drawing the rear base 5 towards the front base 11 in this manner directs the lever arm 17 upwards as a result of its pivotable connection to the pivot module 3 and the bracket members 27. In some scenarios, the height of the device 100 directly correlates to the extent the screw 8 is inserted into the internal chamber 26 of the second leg 21. The device 100 is in an expanded position (as shown in FIG. 1) when the screw 8 is inserted into the lower support member 12 and the lever arm 17 is elevated and angled away from the front base 11.

In accordance with embodiments of the present invention, the angle of the cushion mount 30 may be radially adjusted by adjusting the angle of the mount joint 35. To radially adjust the joint 35, a user may remove the lock pin 49 inserted into the side walls 41 of the mount 35 and the top portion of the lever arm 17 and rotating the mount 35 to a selected or desired position and inserting the lock pin 49 into the holes in the side walls 41 and the lever 17 which correspond to the desired new position.

In some embodiments, a cushion 50 may be installed upon the mount 30 by pressing the cushion 50 onto the mount 30, for example, by pressing or pushing on the cushion 50 to direct the one or more protrusions disposed on the bottom of the cushion 50 into the slots or hollow spaces 37 disposed on the mount 30. This configuration aids in the easy attachment and securement of a cushion or cushions 50 to the mount 30 without the need for bolts, pins, snaps or ties that make assembly complex and time consuming.

As shown in the exemplary usage scenarios depicted in FIGS. 15-18, a plurality of cushion(s) 50 may each be respectively dimensioned to accommodate a side laying or back laying person's back, torso, shoulder, hips and legs, and feet wherein at least one curved cushion(s) adjoined to a mount 30 rests upon a specified and targeted patient body part. A nurse or any patient attendant may reposition and secure the laying person into a series of desired body positions using a system comprised of a lift or modified mechanical jack 14 and the adjoining mount 30 and interchangeable cushion(s) 50. An attendant may reposition a patient, for example, a bedridden person, by using the lift 14, adjoining mount 30 and cushion(s) 50 to reposition, prop and secure the laying patient from a supine or prone laying position into a new position wherein one or more body parts are lifted, raised and secured by the device 100. Once set, the device 100 may prevent a patient from moving from side-to-side, rolling or otherwise shifting into an undesired position.

In an exemplary embodiment, a body lift and positioning device 100 and methods of use, the apparatus including a base 11, a joint 35, for example, a radial adjustment head, a mechanical jack or "lift" 14, a mount 30 and one or more cushion(s) 50 dimensioned to conform and contour to a particular patient body part thereon. The method including the steps of providing a body lift and positioning apparatus 100, the apparatus having a base 11 capable of moving, for example, sliding, on a bed, a mechanical jack 14 capable of being lifted and lowered by means of a rotational device, for example, a socket driver, and contoured cushion(s) 50 configured to fit a particular body part of a person, for example, an immobile or obese patient.

In still a further exemplary embodiment of the invention the cushion(s) 50 may be contoured to fit underneath a patient's back. In some embodiments of the invention a plurality of cushions 50 may be fitted onto one another and configured to conform to a patient's torso to enable the patient to tilt sideways.

In some examples, for purposes of easy and convenient storage and transport the cushions 50 may seat into each other making it possible to move many body parts yet still fit the cushions 50 in a duffel bag. In some embodiments of the invention a plurality of cushions 50 may be fitted into one another and configured to conform to the bottom of a patient's legs to aid in circulation by raising the legs above the heart. In yet another embodiment of the invention one or more cushions 50 may be fitted in order to facilitate propping a patient on their side to aid in changing bed pans.

In accordance with embodiments of the present invention, the cushions 50 may be approximately twenty to twenty six inches in width.

In a method of assembly of an exemplary embodiment of the device 100, an attendant may attach the bottom of the lift 14 to pegs 9 resting on the top portion of a base plate 11 at 90 degree angles. The lift 14 may be attached to the base plate 11 and the joint or radially adjustable accepter head 35 may be attached to the end of the lift's lever arm by the use of pins or carriage bolts 49. The cushion mount or cradle 30 may give a cushion 50 strength and stability in addition to a hard upper platform to be inserted into the lift 14 and an angle may be selected for the cradle by way of the joint 35 using a pin 49. In some embodiments, the upper platform of the mount or cradle 30 may include slots or cavities 37 configured to receive protrusions or columns extending from the cushions 50 to secure the cushions 50 to the cradle or mount. For example, the cushion or plurality of cushions 50 may be fitted together and attached to the cushion cradle 30 by way of columns at the bottom of the cushions that fit into the slots or cavities 37 in the cradle 30 for a snug fit. In some scenarios, an attendant may select the appropriate cushion or plurality of cushions 50 for use. The attendant or attendants may reposition the device 100 across the support surface, for example, a bed, and place it partially underneath and/or adjacent to the body part that the attendant wishes to lift and prop. The attendant or attendants may then manually move the patient or patient body part using a strap or sling or by means of their hands alone. The movement required however, will be minimal since the body part may be placed upon the lowest setting of the lift 14. Once the base 11, lift 14, joint 35, mount 30 and appropriate cushion(s) 50 are assembled, the attendant may place the appropriate patient body part or parts into the appropriate cushion(s) 50 and then, using a rotational device, for example, a powered socket driver, lift the patient's body part to any desired height within the range of the lift's capabilities.

Accordingly, at least one feature of the medical lift and positioning device and methods of use is its ability to enable a single attendant to comfortably maneuver, reposition, roll, lift and/or prop a body part of a large bedridden patient with no other tool needed. In some embodiments, only a strap, for example, a dual clamp locking strap attached to a footboard to form a loop, may be needed to comfortably maneuver, reposition, roll, lift and/or prop a body part of a large bedridden patient. The device itself may be designed for such ease of maneuverability.

In some embodiments, multiple devices 100 may be used to lift and prop more than one patient body part at a time.

In some embodiments, the device 100 provides an efficient, lightweight, highly maneuverable and safe apparatus for the lifting, propping and repositioning of patients, for example, bedridden patients.

In some embodiments, the device 100 enables a single person to quickly and/or efficiently prop a person, for example, a bedridden patient, on either of the patient's sides to maintain patient comfort, facilitate patient examination, and to prevent bed sores from forming.

In some embodiments, the device 100 provides a compact, disassemble able, light and portable apparatus that may be easily stored and transported to a patient's home or hospital room.

In some embodiments, the device 100 assists with bedridden patient rolling, positioning, repositioning, and tilting a bedridden patient from side-to-side and may position, reposition and tilt a particular body part of a patient at various angles between the horizontal and vertical axis.

In some embodiments, the device 100 relieves stress on the fingers, hands, arms, back, shoulders and wrists of the caregiver, especially when the patient is heavy.

In some embodiments, the device 100 accommodates different sized bedridden patients, for example, by use of different sized cushions.

In some embodiments, device 100 and/or the cushions 50 may include one or more limb fastening straps, for example Velcro® straps. In some situations, the limb fastening straps may be utilized to hold a limb, for example, an arm, in place on the cushion 50.

In some embodiments, the device 100 conform to a side laying patient's back, shoulder, torso, hips, and upper legs.

In some embodiments, the device 100 provides a low-cost alternative to systems for lifting, propping, securing and turning a bedridden patient, such as, mechanical means for lifting and turning, including mechanical rollers supported by a stationary or moveable support structure, for example, a heavy steel stationary or moveable support structure, positioned above a hospital bed.

In some embodiments, the device 100 provides a support assembly capable of supporting a patient, for example, a bedridden patient, in an angled position on their side to enable additional positions so that the patient may rest on his or her side to reduce bed sores and to increase comfort of the bedridden patient.

In some embodiments, the device 100 may be utilized with existing beds or bed frames.

In some embodiments, the device 100 may be easier, less expensive, smaller, more expandable, lighter and simpler to use than existing technology.

In some embodiments, the device 100 may be independent of attachment to a ceiling, wall or floor thereby making the device capable of being freely transported and capable of being used in a wide variety of environments, including, for example, on the ground to aid a bleeding soldier by elevating the bleeding injury above the soldier's heart.

In some embodiments, the device 100 is configured to be easy to assemble and disassemble and may fit under a bed, or in a duffel bag for easy transport.

While the present invention has been illustrated by a description of various embodiments and while these embodiments have been described in considerable detail, it is not the intention of the inventor to restrict or in any way limit the scope of the appended claims to such detail. The various features discussed herein may be used alone or in any combination. Additional advantages and modifications will readily appear to those skilled in the art. The invention in its broader aspects is therefore not limited to specific sizes, details, representative apparatus and methods, and illustrative examples shown and described. Accordingly, departures may be made from such details without departing from the spirit or the scope of the inventor's general inventive concept. The scope of the invention itself should only be defined by the following claims.

The invention claimed is:

1. A portable medical lift and positioning device comprising:

a front base configured to support the device on a support surface;

a lift comprising:

a lower support member comprising a telescoping leg attachable to the front base and comprising a first hollow shaft slidably engaged with a second hollow shaft at least partially disposed within the first hollow shaft, the telescoping leg having an internal threaded portion;

a screw formed with an external threaded portion adapted to engage with the internal threaded portion of the telescoping leg;

a rear base that is configured to support the device on the support surface and coupled to a rear section of the telescoping leg to define a rear junction, with a pivot module disposed atop the rear junction;

a lever arm having a lower portion pivotally connected to the pivot module and an upper portion operably connected to a mount joint; and a pair of bracket members in parallel alignment that are movable between a first position and a second position, each bracket member flanking and pivotally connected to both a pivot axis formed on a middle section of the lever arm and a pivot axis formed on a front section of the telescoping leg, wherein a space formed between the pair of bracket members houses at least a portion of both the first hollow shaft and the lever arm when the lift is in the first position; and wherein in the first position the lift is collapsed and in the second position the lift is expanded; and a cushion mount formed with one or more cushion connection points configured to releasably secure a cushion, wherein the cushion mount is attachable to the lift at the mount joint;

wherein engaging the external threaded portion of the screw with the internal threaded portion of the telescoping leg directs the movement of the pivot module of the rear base relative to the front base, thereby moving the rear base relative to the front base and directing the bracket members to pivot from the first position to a second position.

2. The portable lift and positioning device of claim 1, wherein the screw is configured to engage with a socket driver that rotates the screw to move the lift from the first position to the second position and to a desired height between the first position and the second position.

3. The portable lift and positioning device of claim 1, wherein the device is configured to rest on the support surface and the telescoping leg is disposed parallel to the support surface.

4. The portable lift and positioning device of claim 1, wherein the cushion connects to the cushion mount at the one or more cushion connection points formed as circular slots in the cushion mount and adapted to receive one or more protruding tubular connectors disposed on the cushion.

5. The portable medical lift and positioning device of claim 1, wherein each bracket is a straight and unitary member and translates horizontal movement of the first and second hollow shafts to vertical movement of the cushion mount.

6. A portable medical lift and positioning device comprising:

a front base configured to support the device on a support surface;

a lift comprising:

a lower support member comprising a telescoping leg attachable to the front base and comprising a first hollow shaft slidably engaged with a second hollow shaft at least partially disposed within the first hollow shaft, the telescoping leg having an internal threaded portion;

a screw formed with an external threaded portion adapted to engage with the internal threaded portion of the telescoping leg;

a rear base that is configured to support the device on the support surface and coupled to a rear section of the telescoping leg to define a rear junction, with a pivot module disposed atop the rear junction, wherein the pivot module comprises a pair of panels which flank a rear section of the lever arm to support its rotation about a pivot point formed on each of the panels;

a lever arm having a lower portion pivotally connected to the pivot module and an upper portion operably connected to a mount joint; and a pair of bracket members in parallel alignment, each bracket member flanking and pivotally connected to both a pivot axis formed on a middle section of the lever arm and a pivot axis formed on a front section of the telescoping leg;

a cushion mount formed with one or more cushion connection points configured to releasably secure a cushion, wherein the cushion mount is attachable to the lift at the mount joint;

wherein engaging the external threaded portion of the screw with the internal threaded portion of the telescoping leg directs the movement of the pivot module of the rear base relative to the front base, thereby moving the rear base relative to the front base and directing the bracket members to pivot from a first position to a second position; and wherein in the first position the lift is collapsed and in the second position the lift is expanded.

7. A portable medical lift and positioning device comprising:

a front base configured to support the device on a support surface;

a lift comprising:

a lower support member comprising a telescoping leg attachable to the front base and comprising a first hollow shaft slidably engaged with a second hollow shaft at least partially disposed within the first hollow shaft, the telescoping leg having an internal threaded portion;

a screw formed with an external threaded portion adapted to engage with the internal threaded portion of the telescoping leg;

a rear base that is configured to support the device on the support surface and coupled to a rear section of the telescoping leg to define a rear junction, with a pivot module disposed atop the rear junction;

a lever arm having a lower portion pivotally connected to the pivot module and an upper portion operably connected to a mount joint; and a pair of bracket members in parallel alignment, each bracket member flanking and pivotally connected to both a first pivot axis formed on a middle section of the lever arm and a second pivot axis formed on a front section of the telescoping leg;

a cushion mount formed with one or more cushion connection points configured to releasably secure a cushion, wherein the cushion mount is attachable to the lift at the mount joint;

wherein engaging the external threaded portion of the screw with the internal threaded portion of the telescoping leg causes the second hollow shaft to move toward the first hollow shaft, thereby directing the movement of the rear base relative to the front base, thereby decreasing the distance between the pivot module of the rear base and the second pivot axis of the telescoping leg, thereby directing the bracket members to pivot and angle upwards from a first position to a second position as a result of being pivotally connected to each of the first and second pivot axes, thereby directing the lever arm to angle upwards and increasing the height of the cushion mount; and wherein in the first position the lift is collapsed and in the second position the lift is expanded.

* * * * *